United States Patent
Jinno et al.

(10) Patent No.: US 11,104,051 B2
(45) Date of Patent: Aug. 31, 2021

(54) MOLDING MACHINE AND CONTROL METHOD OF MOLDING MACHINE

(71) Applicant: Kabushiki Kaisha Meiki Seisakusho, Aichi (JP)

(72) Inventors: Shizuo Jinno, Kariya (JP); Hisanaga Tajima, Inazawa (JP); Shinji Hayashi, Ohbu (JP); Hiroki Hasegawa, Toyoake (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 317 days.

(21) Appl. No.: 16/372,579

(22) Filed: Apr. 2, 2019

(65) Prior Publication Data
US 2019/0299510 A1 Oct. 3, 2019

(30) Foreign Application Priority Data
Apr. 2, 2018 (JP) .............................. JP2018-070730

(51) Int. Cl.
*B29C 45/80* (2006.01)
*B29C 45/66* (2006.01)

(52) U.S. Cl.
CPC ............ *B29C 45/80* (2013.01); *B29C 45/661* (2013.01); *B29C 2945/76083* (2013.01);
(Continued)

(58) Field of Classification Search
CPC ..... B29C 45/67; B29C 45/76; B29C 45/7653; B29C 45/76086; B29C 45/76936; B29C 45/76461; B29C 45/76391
See application file for complete search history.

(56) References Cited

U.S. PATENT DOCUMENTS 4,828,476 A   5/1989  Yoshiharu et al.
6,613,262 B1* 9/2003  Arend ................... B29C 45/045
                                                    264/255
(Continued)

FOREIGN PATENT DOCUMENTS

CN    102470592 A   5/2012
CN    106363882 A   2/2017
(Continued)

OTHER PUBLICATIONS

The First Office Action Corresponding Chinese Application No. 201910263330.2 dated Jan. 11, 2021.

*Primary Examiner* — Joseph S Del Sole
*Assistant Examiner* — Thu Khanh T Nguyen
(74) *Attorney, Agent, or Firm* — Renner, Otto, Boisselle & Sklar, LLP (57) ABSTRACT

Provided is a molding machine including a mold opening/closing mechanism configured to move a movable platen to be attached with a movable mold to a stationary platen to be attached with a stationary mold, and a clamping mechanism to perform a clamping process, and is intended to suppress machine cost or ensure the mold opening/closing speed. The molding machine includes the mold opening/closing mechanism configured to move the movable platen to be attached with the movable mold to the stationary platen to be attached with the stationary mold, and the clamping mechanism configured to perform a clamping process. The mold opening/closing mechanism includes at least two ball screws, at least two electric motors that respectively drive the ball screws, and a ball screw nut into which each of the ball screws is inserted.

5 Claims, 5 Drawing Sheets

(52) U.S. Cl.
CPC ............... *B29C 2945/76227* (2013.01); *B29C 2945/76391* (2013.01); *B29C 2945/76568* (2013.01); *B29C 2945/76709* (2013.01); *B29C 2945/76869* (2013.01); *B29C 2945/76936* (2013.01)

(56) References Cited

U.S. PATENT DOCUMENTS

| | | | |
|---|---|---|---|
| 6,932,924 B2 * | 8/2005 | Nishizawa | B29C 45/66 264/40.5 |
| 7,179,409 B2 * | 2/2007 | Nishino | B29C 45/1751 264/328.1 |
| 7,288,221 B2 * | 10/2007 | Tsuji | B29C 45/6728 264/40.5 |
| 7,614,870 B2 | 11/2009 | Chen et al. | |
| 7,824,167 B2 * | 11/2010 | Tsuji | B29C 45/1751 425/190 |
| 8,163,218 B2 | 4/2012 | Kato et al. | |
| 2012/0034330 A1 | 2/2012 | Fujita et al. | |
| 2016/0129619 A1 | 5/2016 | Fujita et al. | |
| 2019/0152112 A1 * | 5/2019 | Kako | B29C 45/7653 |

FOREIGN PATENT DOCUMENTS

| | | |
|---|---|---|
| JP | H04-33255 A | 10/1988 |
| JP | H05-56249 A | 2/1998 |
| JP | 2002-154146 A | 5/2002 |
| JP | 201577725 A | 4/2016 |
| WO | 2009/118833 A1 | 10/2009 |

\* cited by examiner

MOLDING MACHINE AND CONTROL METHOD OF MOLDING MACHINE

BACKGROUND OF THE INVENTION (1) Field of the Invention

The present invention relates to a molding machine and a method for controlling the molding machine including a mold opening/closing mechanism configured to move a movable platen to be attached with a movable mold to a stationary platen to be attached with a stationary mold, and a clamping mechanism configured to perform a clamping process.

(2) Description of Related Art

A molding machine described in Japanese Patent Application Laid-Open No. 2015-77725 ([0014], FIG. 1) (hereinafter, referred to as "Patent Literature 1") is conventionally known as the one including a mold opening/closing mechanism configured to move a movable platen to be attached with a movable mold to a stationary platen to be attached with a stationary mold, and a clamping mechanism configured to perform a clamping process. The fourteenth paragraph ([0014]) of Patent Literature 1 describes that to shorten the molding cycle and increase the accuracy of the molding cycle and also to achieve electric power regeneration to be described later, a mechanical drive mechanism driven by a servomotor is preferably used as the mold opening/closing mechanism; alternatively, a hydraulic cylinder may be used for the purpose of reducing the facility cost.

In FIG. 1 of Patent Literature 1, a clamping unit including the stationary platen and the movable platen is provided with two mold opening/closing mechanisms. In this example, a ball screw of each mold opening/closing mechanism is driven to rotate by one servomotor. However, in a relatively large molding machine in which a mold opening/closing mechanism and a clamping mechanism are separately provided, a large servomotor is required in a case where a ball screw is driven to rotate by one servomotor. However, there are not many types of large servomotors, and they are expensive; in some cases, there may be no motors corresponding to the required capability, or it may require a special order item. Furthermore, in a case of using a small servomotor, it is necessary to increase the reduction ratio, thus there is a problem that sufficient mold opening/closing speed is not achieved.

Furthermore, a technology according to Japanese Examined Patent Publication No. 05-56249 (claim 1, column 6 on page 3 to column 7 on page 4, FIG. 1) (hereinafter, referred to as "Patent Literature 2") is known as the one that performs opening/closing and clamping of molds by causing two servomotors to drive one ball screw. However, in Patent Literature 2, an electric motor used to drive a mold opening/closing mechanism is only a servomotor 10, and a movable platen is moved by the servomotor 10 only. Then, after a mold closing operation, an induction motor 18 is operated to clamp the molds together.

Moreover, a technology according to Japanese Examined Patent Publication No. 04-33255 (claim 1, column 8 on page 4, FIG. 1) (hereinafter, referred to as "Patent Literature 3") is also known as a technology similar to Patent Literature 2. In Patent Literature 3, at the time of normal opening/closing of molds, an electric servomotor 58 is driven to rotate, thereby a ball screw is rotated to move a movable platen. Then, after closing of the molds, an electric servomotor 38 is rotated to press the movable platen against a stationary platen. Column 8 (the right column) on page 4 in Patent Literature 3 describes that the mold opening/closing speed is further increased by using the electric servomotor 38 in combination with the electric servomotor 58. However, in the measures of Patent Literature 3, respective ball screws rotated by the electric servomotors 38 and 58 differ in pitch, thus there is a problem that it is very difficult to perform control enabling the both servomotors to fulfill their capability. Furthermore, the ball screws used in Patent Literature 3 are special ones that differ in pitch, which leads to an increase in cost of the machine.

SUMMARY OF THE INVENTION

In the above-described technologies according to Patent Literatures 2 and 3, one ball screw is moved by two electric motors; still, they are not enough to meet challenges in suppressing the device cost of the mold opening/closing mechanism and ensuring the mold opening/closing speed in the molding machine in which the mold opening/closing mechanism and the clamping mechanism are independently provided.

An object of the present invention is to provide a molding machine capable of suppressing the cost of the machine and ensuring the mold opening/closing speed and a method for controlling the molding machine in a molding machine including a mold opening/closing mechanism configured to move a movable platen to be attached with a movable mold to a stationary platen to be attached with a stationary mold, and a clamping mechanism configured to perform a clamping process, Claim 1 of the present invention describes a molding machine including a mold opening/closing mechanism configured to move a movable platen to be attached with a movable mold to a stationary platen to be attached with a stationary mold, and a clamping mechanism configured to perform a clamping process, in which the mold opening/closing mechanism includes at least two ball screws, at least two electric motors that respectively drive the ball screws, and a ball screw nut into which each of the ball screws is inserted.

Claim 2 of the present invention describes the molding machine according to claim 1 that includes two ball screws with single-start threads, two driven pulleys fixed to the respective ball screws, two electric motors that drive the respective ball screws, drive pulleys each fixed to a drive shaft of a corresponding one of the electric motors, a first belt hung around one of the two driven pulleys and one of the drive pulleys, a second belt hung around another one of the two driven pulleys and another one of the drive pulleys, and the ball screw nut into which each of the two ball screws is inserted.

Claim 3 of the present invention describes the molding machine according to claim 1 or 2, in which four tie bars are inserted into the movable platen, and the ball screw nut is fixed to a portion of the movable platen below respective upper portions of circumferential surfaces of two of the four tie bars located on a lower side.

Claim 4 of the present invention describes a method for controlling a molding machine, the molding machine including a mold opening/closing mechanism configured to move a movable platen to be attached with a movable mold to a stationary platen to be attached with a stationary mold and a clamping mechanism configured to perform a clamping process, in which the mold opening/closing mechanism includes at least two ball screws, at least two servomotors that respectively drive the ball screws, and a ball screw nut into which each of the ball screws is inserted. The method according to claim 4 includes detecting a position of the movable platen with an encoder of any one of the servomotors.

According to the molding machine of the present invention, in a molding machine including a mold opening/closing mechanism configured to move a movable platen to be attached with a movable mold to a stationary platen to be attached with a stationary mold, and a clamping mechanism configured to perform a clamping process, the mold opening/closing mechanism includes at least two ball screws, at least two electric motors that drive the ball screws, and a ball screw nut into which the ball screws are inserted; therefore, it is possible to suppress the cost of the machine and ensure the mold opening/closing speed.

DETAILED DESCRIPTION OF PREFERRED EMBODIMENTS

Figure 1:
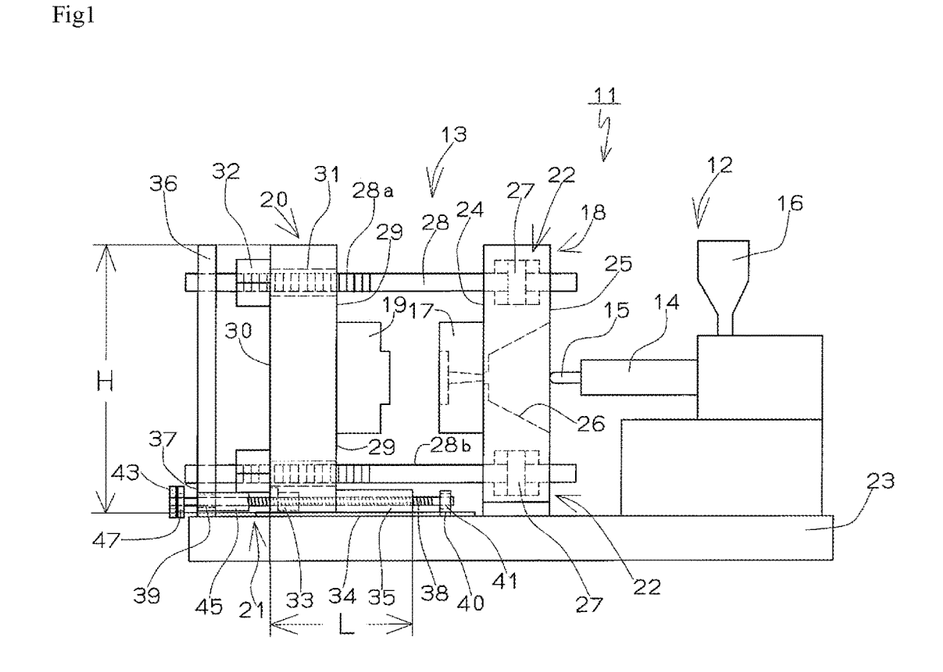
FIG. 1 is a front view of an injection molding machine according to an embodiment.

FIG. 1 is a front view of an injection molding machine 11 that is a type of molding machine according to the present invention, where a cover and a safety door are omitted. The injection molding machine 11 according to an embodiment of the present invention is described with reference to FIGS. 1 and 2. The hybrid injection molding machine 11 using a hydraulic mechanism in combination with an electric drive mechanism includes an injection unit 12 on one side thereof (the right side in FIG. 1) and a clamping unit 13 on the other side thereof (the left side in FIG. 1).

First, the injection unit 12 is described. A known electric injection unit is used as the injection unit 12; a screw forward/backward movement mechanism (not illustrated) and a screw rotation mechanism (not illustrated) are driven by an electric motor. The injection unit 12 is provided with a nozzle 15 on a distal end of a heating cylinder 14 provided with a heater (not illustrated). A housing plate (not illustrated) near the back of the heating cylinder 14 is provided with a material feeder 16. A screw (not illustrated) is installed in an inner hole of the heating cylinder 14. The screw can be rotated by the screw rotation mechanism, and can be moved forward and backward by the screw forward/backward movement mechanism. Note that the injection unit 12 may be the one using a hydraulic mechanism.

Subsequently, the clamping unit 13 is described. The clamping unit 13 includes a mold opening/closing mechanism 21 configured to move a movable platen 20 to be attached with a movable mold 19 to a stationary platen 18 to be attached with a stationary mold 17, and a clamping mechanism 22 configured to perform a clamping process. A molding machine like this injection molding machine 11 in which the mold opening/closing mechanism 21 and the clamping mechanism 22 are independently provided is relatively large. Although not limited to this, relatively large molding machines include, for example, all those having a clamping force of 10,000 kN or more and the upper limit of the clamping force is equal to or less than the clamping force of any practical unit, for example, 70,000 kN or less.

The stationary platen 18 is fixedly installed on a bed 23 in a standing manner. A rear-surface-side portion of a mold attachment surface 24 of the stationary platen 18 to which the stationary mold 17 is attached is provided with a plurality of ribs or the like (not illustrated), and the entire platen is not a solid member. A depression 26 into which the heating cylinder 14 and the nozzle 15 of the injection unit 12 are inserted is formed on the center of a rear surface 25 of the stationary platen 18. The nozzle 15 of the injection unit 12 can be brought into contact with the stationary mold 17 through the depression 26 and a locating ring (not illustrated). In the present embodiment, the molds 17 and 19 are clamped together by clamping cylinders 27 that are the clamping mechanism 22 using a pressure medium (hydraulic oil). The clamping cylinders 27 are provided near the four corners of the stationary platen 18, and respective rods of the clamping cylinders 27 constitute tie bars 28. A groove 28a for engagement with a half nut is circumferentially formed on each tie bar 28.

The rear surface side of a mold attachment surface 29 of the movable platen 20 to which the movable mold 19 is attached is provided with a plurality of ribs or the like (not illustrated), and the entire platen is not a solid member. A platen body thickness of the main body of the movable platen 20 (a thickness from the mold attachment surface 29 to a rear surface 30) is greater than a platen body thickness of the main body of the stationary platen 18 (a thickness from the mold attachment surface 24 to the rear surface 25). The tie bars 28 are slidably inserted into respective inner holes of cylindrical bushes 31 near the four corners of the movable platen 20. Half nuts 32 engaged with the above grooves 28a are provided around respective positions on the rear surface 30 of the movable platen 20 to which the bushes 31 are attached. Furthermore, the movable platen 20 is provided with an ejector mechanism, etc. (not illustrated) as well. Moreover, ball screw nuts 33 of the mold opening/closing mechanism 21 to be described later are fixed to portions of the movable platen 20 below respective upper portions 28b of the circumferential surfaces of the lower tie bars 28.

Figure 2:
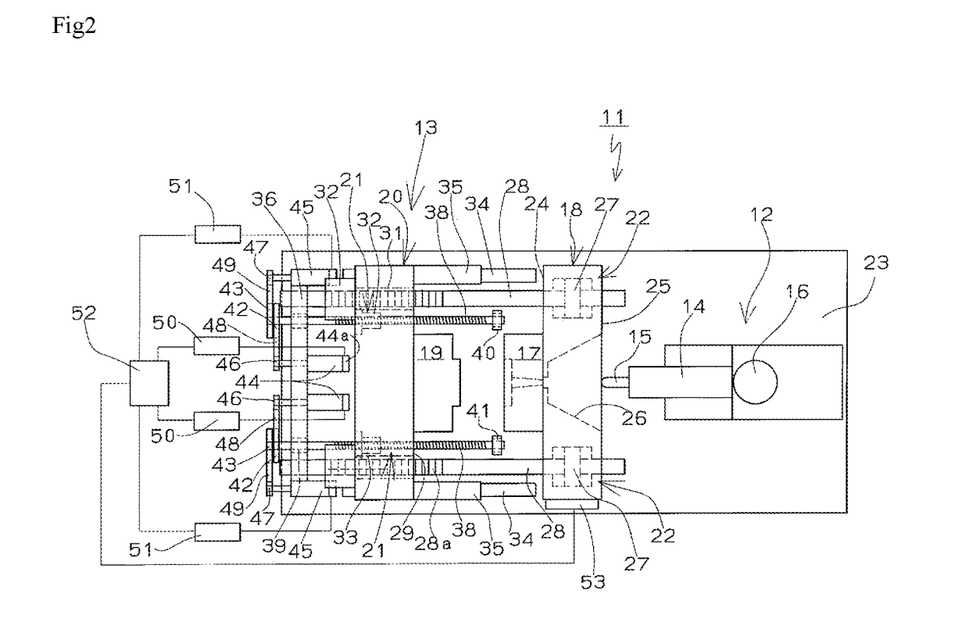
FIG. 2 is a plan view of the injection molding machine according to the embodiment.

On an upper surface of the bed 23, at least two guide rails 34 (or a guide plate) are provided in directions of the one side and the other side of the hybrid injection molding machine 11 in FIGS. 1 and 2. The movable platen 20 can be moved in a mold opening/closing direction along the guide rails 34. The movable platen 20 is provided with legs 35 on the bed side (the touched area side) thereof. In the present embodiment, a horizontal length L of the legs 35 including the platen body of the movable platen main body is equal to or more than one-half of a height H of the platen body of the movable platen 20 including the legs 35 (excluding a height of the bed 23). The following are the reasons why such long legs 35 are provided. That is, if the ball screw nuts 33 are attached to portions of the movable platen 20 below the respective upper portions 28b of the circumferential surfaces of the two lower tie bars 28, the movable platen 20 is likely to be unstable when the movable platen is moved; therefore, as a countermeasure for this, the legs 35 are configured to be long. Furthermore, as the movable mold 19 that is a heavy load is attached to the mold attachment surface 29 of the movable platen 20, the legs 35 are provided to extend forward (to the stationary platen side) in order to prevent the movable platen 20 from falling forward. As a moving part mechanism (not illustrated) provided on a bottom surface of each leg 35 of the movable platen 20, a linear motion member, such as a linearguide®, may be used, or a rotary moving body, such as a wheel or a roller, may be provided. Furthermore, a sliding body having low friction characteristics, such as a Turcite plate, may be attached to at least either the bottom surface of each legs 35 or the guide plate so that the movable platen 20 is configured to make a sliding movement.

Figure 3:
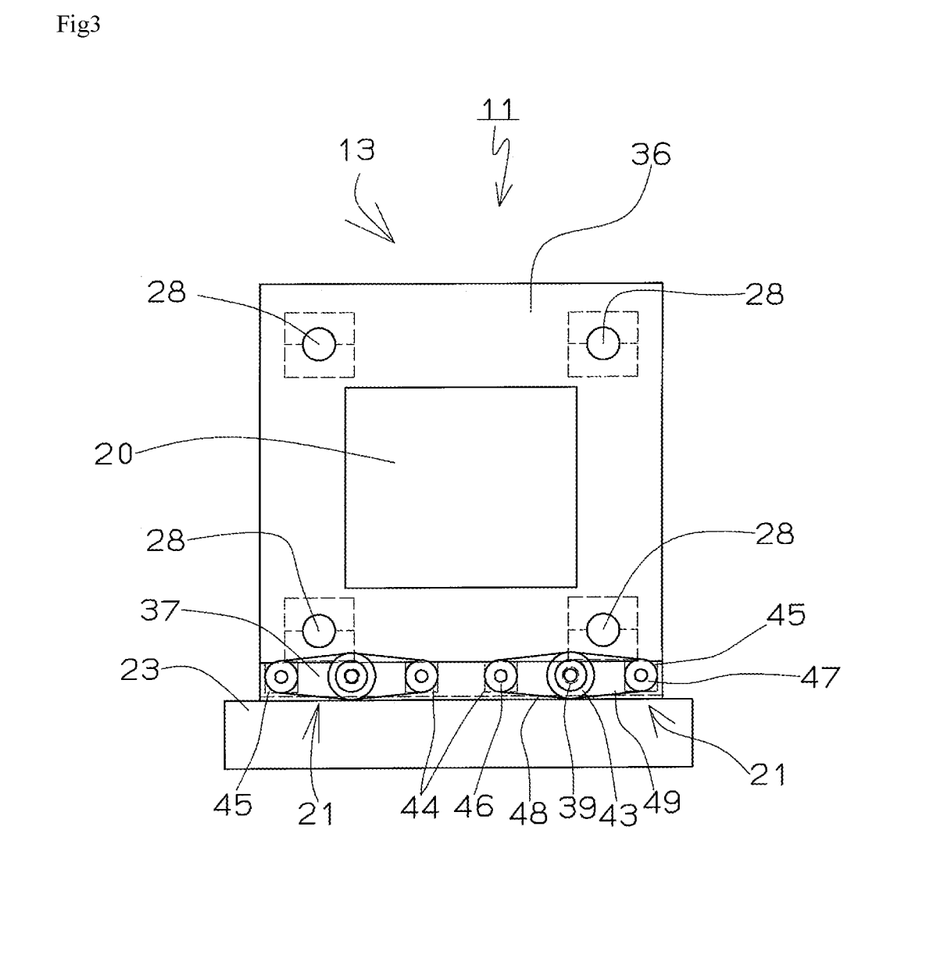
FIG. 3 is a side view of the injection molding machine according to the embodiment.

In the present embodiment, an end of each tie bar 28 is inserted into a tie bar holder 36 provided to stand on the upper surface of the bed 23 on the other side of the movable platen 20. A relationship between the tie bar holder 36 and the tie bars 28 is that each tie bars 28 is inserted into the tie bar holder 36 so that a circumferential surface of the tie bar 28 is slidable against the tie bar holder 36. The tie bar holder 36 is a member unaffected by a clamping force, and is a plate body thinner than the stationary platen 18, etc. As illustrated in FIG. 3, the tie bar holder 36 has a shape of a picture frame with a space in the center thereof, and the tie bars 28 are inserted into near the four corners of the tie bar holder 36. In the present embodiment, a lower part of the tie bar holder 36 below the portions into which the lower tie bars 28 are inserted serves as a holding portion 37 that holds part of the mold opening/closing mechanism 21. Note that the tie bar holder 36 may be configured to hold only the lower tie bars 28. Furthermore, the tie bar holder 36 itself is not an indispensable member; thus, it may sometimes be omitted.

Subsequently, the mold opening/closing mechanism 21 of the clamping unit 13 is described. In the present invention, the mold opening/closing mechanism 21 is a mechanical structure using an electric motor and a screw feed mechanism. Two mold opening/closing mechanisms 21 are provided on the operation side and the opposite-operation side on the bed 23, and they both are located on the underside of the movable platen 20. The operation-side mold opening/closing mechanism 21 is described. A bearing 39 is attached to the holding portion 37 of the tie bar holder 36, and a ball screw 38 is inserted into the bearing so that the ball screw 38 can be rotated and be subjected to an axial force. Furthermore, a bearing 41 is attached to a bracket 40 attached to an intermediate position on the operation-side upper surface of the bed 23 between the stationary platen 18 and the movable platen 20. An end of one side of the ball screw 38 is rotatably inserted into the bearing 41. Therefore, the ends of the ball screw 38 are held parallel to the mold opening/closing direction by the bearings 39 and 41. The ball screw 38 used in the present embodiment is a general one with single-start threads in the effective lead length portion.

As illustrated in FIG. 3, with a slight distance between them in an axial direction, two driven pulleys 42 and 43 are fixed to a portion of the ball screw 38 other than the effective lead length portion on the other side of the portion axially held by the bearing 39 (the left side in FIG. 1). Furthermore, servomotors 44 and 45 that are electric motors are fixed, with their drive shaft facing each other, at positions on both sides of a portion of the holding portion 37 of the tie bar holder 36 to which the bearing 39 is attached. Drive pulleys 46 and 47 are attached to the drive shafts of the servomotors 44 and 45, respectively. A timing belt 48 (a first belt) is hung between the driven pulley 42 and the drive pulley 46 of the servomotor 44 (the electric motor). Furthermore, a timing belt 49 (a second belt) is hung between the driven pulley 43 and the drive pulley 47 of the servomotor 45 (the electric motor).

Note that in the present embodiment, the distance between the ball screw 38 and the servomotor 44 and the distance between the ball screw 38 and the servomotor 45 are an equal distance. However, depending on problems in the space of the unit, etc., the distance between the ball screw 38 and the servomotor 44 and the distance between the ball screw 38 and the servomotor 45 may be configured to be different distances. In that case, naturally, the timing belts 48 and 49 are configured to have different lengths according to the difference in the distance. Furthermore, in the present embodiment, servomotors of the same spec are used as the servomotors 44 and 45. However, servomotors of different specs that drive one ball screw to rotate are not excluded. In the above-described combination, the number of servomotors that drive one ball screw to rotate may be any number as long as it is at least two, and it may be three or four. Moreover, the servomotors 44 and 45 and the ball screw 38 may be attached to a bracket of a holding portion of another mold opening/closing mechanism on the bed 23 other than the holding portion 37 of the tie bar holder 36. In that case, both of the operation-side and opposite-operation-side mold opening/closing mechanisms may be attached to one bracket, or may be attached to separate brackets.

As the opposite-operation-side mold opening/closing mechanism 21 has a similar structure to the operation-side mold opening/closing mechanism 21, its description using different reference numerals is omitted; however, the drive pulleys 46 and 47 of the two servomotors 44 and 45 are connected to the driven pulleys 42 and 43 of one ball screw 38, and the one ball screw 38 is driven to rotate by the two servomotors 44 and 45. A method of providing two mold opening/closing mechanism 21 and 21 on the bed 23 in this way has advantages that the ball screws 38 and 38 can be configured to have the both-end support structure, and therefore it is possible to eliminate the runout of the ends of the ball screws when rotating, and also wirings, etc. to the fixedly attached servomotors 44 and 45 and greasing of the ball screw 38 can be easily performed pass through the bed 23. Furthermore, the mold opening/closing mechanism 21 and 21 are provided on the lower part of the movable platen 20, thus the space used when pipes are attached to the molds 17 and 19 or when molds 17 and 19 to be replaced are attached to the stationary platen 18 and the movable platen 20 from a horizontal direction can be increased, which facilitates workers to do the molding work. Then, the problem that the movable platen 20, particularly, its upper part becomes unstable when moved is solved, as described above, by making the mold thickness of the movable platen 20 thicker and extending the legs 35 forward, and providing the tie bar insertion portions of the movable platen 20 with the bushes 31 whose inner hole surface slides against the circumferential surface of the corresponding tie bar 28. Note that the ball screw nuts 33 of the mold opening/closing mechanism 21 may be attached to near the lower tie bars 28 on a side surface of the movable platen 20. In that case, it is often the case that the width of the injection molding machine 11 needs to be increased; however, it is often the case that the height of the injection molding machine 11 can be suppressed.

Subsequently, a control system according to the present embodiment is briefly described with reference to FIG. 2. The servomotor 44 of the operation-side mold opening/closing mechanism 21 is connected to a servo amplifier 50, and the servomotor 45 is connected to a servo amplifier 51.

Furthermore, the servomotors 44 and 45 of the opposite-operation-side mold opening/closing mechanism 21 are also connected to the servo amplifiers 50 and 51, respectively. The servo amplifiers 50, 50, 51, and 51 are connected to a higher-level control unit 52. Then, a detection value of an encoder 44*a* of, of the four servomotors 44, 44, 45, and 45, one servomotor 44 is used as a position of the movable platen 20 to perform control and displayed on a display unit 53. Therefore, the one servomotor 44 is, as a master motor, subjected to closed-loop control on the basis of a command value from the control unit 52, and the other three servomotors are, as a slave motor, subjected to follow-up control of following the position of the master motor (the rotation angle detected by the encoder). Note that the position control on the servomotors 44, 44, 45, and 45 is not limited to the above, and may be performed by a method of controlling the motors independently of one another to a command position. Furthermore, a position sensor, such as a linear scale, is attached between the stationary platen 18 or the bed 23 and the movable platen 20, and the one using a sensor other than the encoders of the servomotors 44 and 45 to perform control is not excluded.

Subsequently, the operation of the injection molding machine 11 and molding by injection molding machine 11 are described. FIG. 1 illustrates a state in which the movable platen 20 stops in a mold opening completion position; a mold closing process starts from the state illustrated in FIG. 1. In the mold closing process, the four servomotors 44, 44, 45, and 45 (hereinafter, abbreviated as "the (four) servomotors 44 and 45") are fully driven, and the respective ball screws 38 are driven through the timing belts 48 and 49. At this time, the servomotors 44 and 45 are subjected to follow-up control as described above, thus driving torque is transmitted to the ball screws 38 and 38 without great loss. Then, the movable platen 20 is suddenly accelerated and then moved at high speed, and, when the position of the movable platen 20 read by the encoder 44*a* of the servomotor 44 has reached a predetermined position, the four servomotors 44 and 45 makes transition to low-speed drive control, and the movable platen 20 is moved at low speed. After that, through a control process at a mold protection stage, the movable mold 19 comes into contact with the stationary mold 17, and a cavity is formed.

At the same time as or at timing slightly before the contact of the molds, the half nuts 32 are operated, and teeth of the half nuts 32 are engaged with the grooves 28*a* of the tie bars 28. After that, the clamping cylinders 27 of the clamping mechanism 22 are operated to pull the tie bars 28, thereby clamping a mold composed of the stationary mold 17 and the movable mold 19. Note that the servomotors 44 and 45 are of the mold opening/closing mechanisms 21 is turned to servo-off at the same time as the contact of the molds or when the clamping force has reached a fixed value. Then, when the clamping force has reached the fixed value by the set working of the clamping mechanism 22, the screw forward/backward movement mechanism of the injection unit 12 is operated to move forward, and molten resin in the heating cylinder 14 is injected into the cavity of the mold through the nozzle 15.

In a cooling process after the injection, the molten resin in the cavity is cooled and solidified, and in parallel with this, a measuring process for the next molding is performed by the injection unit. After a lapse of a predetermined time from the injection (the completion of dwelling as an example), the cooling process ends. Then, after the pressure of oil chambers for mold clamping of the clamping cylinders 27 are released, a strong mold opening process is performed.

The strong mold opening process is generally performed with the clamping cylinders 27, and mold release and opening of the movable mold 19 from the stationary mold 17 is performed at fixed intervals. At this time, the servomotors 44 and 45 of the mold opening/closing mechanisms 21 may be driven at the same time, or may remain serve-off. Furthermore, depending on the structure of a molding machine, a strong mold opening process may be performed by the servomotors 44 and 45 of the mold opening/closing mechanisms 21. At this time, a molded article is generally held by the movable mold 19 and released. Then, after the strong mold opening process ends, the pressure of oil chambers for strong mold opening of the clamping cylinders 27 are released, and then the half nuts 32 are separated from the engagement grooves 28*a* of the tie bars 28.

Then, in the next mold opening process (high-speed mold opening process), the four servomotors 44 and 45 are fully driven, and, as with the mold closing process, the movable platen 20 is suddenly accelerated and then moved at high speed, and is moved from the predetermined position at low speed. And then, when the position of the movable platen 20 read by the encoder 44*a* of the servomotor 44 has reached the mold opening completion position, the all servomotors 44 and 45 are stopped being driven. A method for controlling the servomotors 44 and 45 follows that is in the mold closing process. Then, when the movable platen 20 and the movable mold 19 have positioned and stopped in the mold opening completion position, the molded article is taken out from the movable mold 19 by a robot (not illustrated), and one molding cycle ends.

Figure 4:
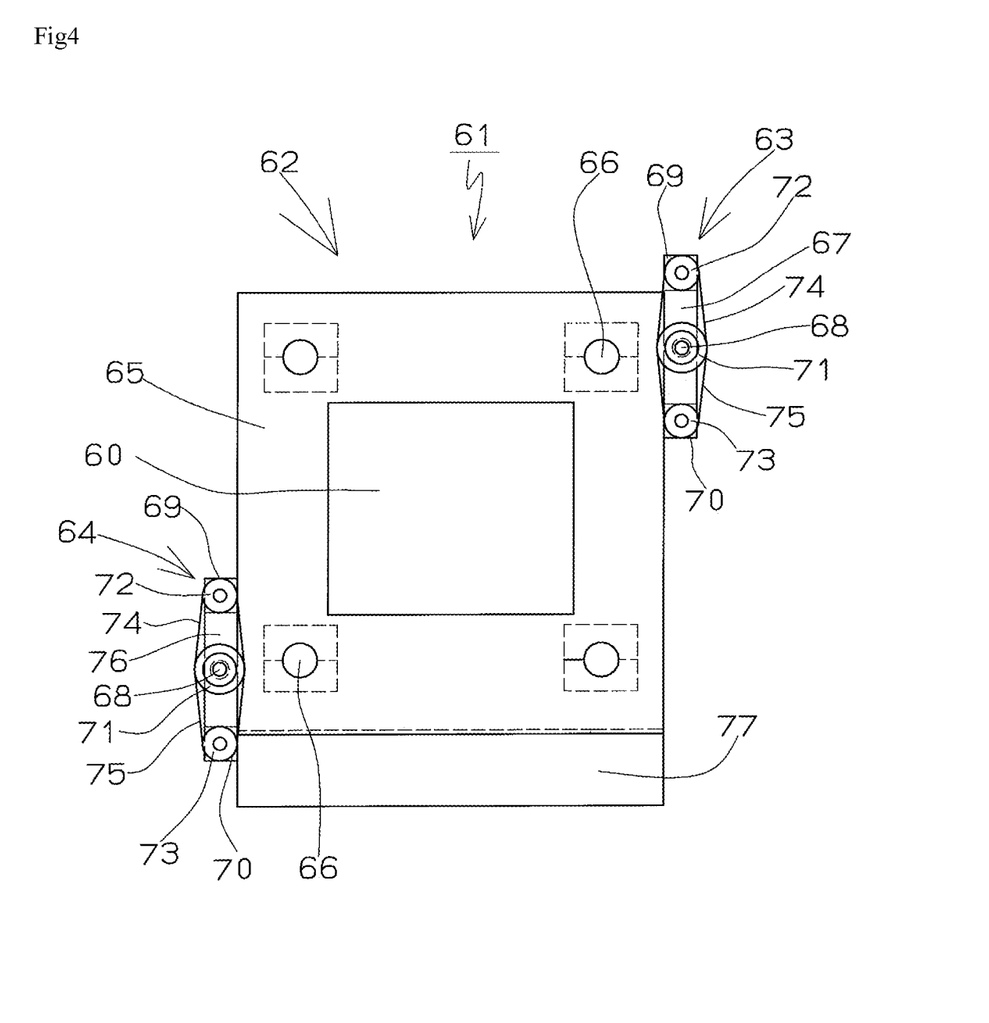
FIG. 4 is a side view of an injection molding machine according to another embodiment.

Subsequently, there is described a clamping unit 62 of an injection molding machine 61 according to another embodiment illustrated in FIG. 4. The clamping unit 62 is similar to the example illustrated in FIG. 1, except for the layout of mold opening/closing mechanisms 63 and 64. As for the mold opening/closing mechanism 63 and 64, the one mold opening/closing mechanism 63 is provided near an upper tie bar on the operation side of a stationary platen and a movable platen 60. Furthermore, the other mold opening/closing mechanism 64 is provided near a lower tie bar on the opposite side of the stationary platen and the movable platen 60. More specifically, a motor and a bracket 67 for ball screw attachment are fixed to a side surface near a portion of the operation side of a tie bar holder 65 into which an upper tie bar 66 is inserted. Then, a bearing is fixed to the center of the bracket 67, and a ball screw 68 is rotatably inserted into the bearing. Furthermore, servomotors 69 and 70 are fixed one above the other across the ball screw 68. Then, a driven pulley 71 fixed to the ball screw 68 and a drive pulley 72 fixed to a drive shaft of the servomotor 69 are connected by a timing belt 74. Another driven pulley 71 fixed to the ball screw 68 and a drive pulley 73 fixed to a drive shaft of the other servomotor 70 are connected by a timing belt 75. Furthermore, although not illustrated, a ball screw nut is fixed to a bracket attached to near an upper tie bar on the operation side of the movable platen 60, and a ball screw 68 is rotatably inserted into the ball screw nut. The ball screw 68 is held only by the ball screw nut, and an end of the ball screw 68 is not held by a bearing.

As for the other mold opening/closing mechanism 64, a bracket 76 is fixed to a side surface near a portion of the opposite side of the tie bar holder 65 into which a lower tie bar 66, and, as with the operation side, the mold opening/closing mechanism 64 includes the two servomotors 69 and 70, the drive pulleys 72 and 73, the timing belts 74 and 75, and the driven pulleys 71 and 71, and the ball screw 68 is driven to rotate by the two servomotors 69 and 70. Then, the ball screw 68 is rotatably inserted into a ball screw nut (not illustrated) provided on the lower part of the opposite-operation side of the movable platen 60. Then, the end of the ball screw 68 is not held, as with the operation side. However, the end of the ball screw 68 of the other mold opening/closing mechanism 64 can be rotatably held by a bearing provided on a bracket on a bed 77. Note that as a modification example of the embodiment illustrated in FIG. 4, mold opening/closing mechanisms may be provided near the operation-side lower tie bar and near the opposite-operation-side upper tie bar. In the injection molding machine 61 according to the other embodiment illustrated in FIG. 4, the mold opening/closing mechanisms are provided in diagonal positions to the central axis of the movable platen 60 and the stationary platen; therefore, the mold opening/closing mechanisms often contribute to stable movement of the movable platen 60.

Figure 5:
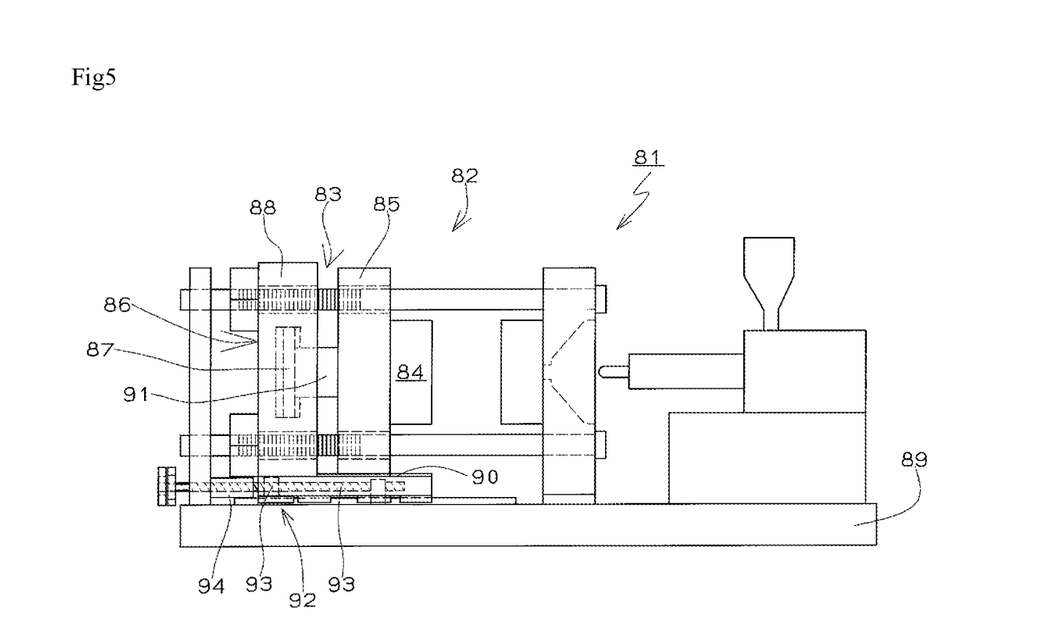
FIG. 5 is a front view of an injection molding machine according to still another embodiment.

Subsequently, an injection molding machine 81 according to still another embodiment illustrated in FIG. 5 is described with a focus on differences from the embodiment illustrated in FIG. 1. In an example illustrated in FIG. 5, a movable platen 83 of a clamping unit 82 includes a first movable platen 85 to be attached with a movable mold 84 and a second movable platen 88 equipped with a clamping cylinder 87 that is a clamping mechanism 86. The second movable platen 88 located on the back side is directly mounted on a bed 89, and is capable of moving on the bed 89. The second movable platen 88 has a placement table 90 extending forward on the lower part thereof, and the first movable platen 85 is movably mounted on the placement table 90. A ram 91 of the clamping cylinder 87 provided on the second movable platen 88 is fixed to a rear surface of the first movable platen 85. In the embodiment illustrated in FIG. 5, a mold opening/closing mechanism 92 similar to that is illustrated in FIG. 1 is provided on the bed 89. Both ends of a ball screw 93 of the mold opening/closing mechanism 92 are rotatably held by a bearing provided on a member such as bracket or a tie bar holder on the bed 89. As a mechanism using two servomotors 94 is the same as that is in FIG. 1, its description is omitted. A ball screw nut 95 into which the ball screw 93 is inserted is fixed to the movable platen 83 (here, a side surface of the placement table 90 of the second movable platen 88).

Note that as a modification example of the embodiment illustrated in FIG. 5, a first movable platen located on the front side may be directly movably mounted on a bed and be capable of moving; a placement table extending backward may be fixed to the lower part the first movable platen; and a second movable platen may be movably mounted on the placement table. Then, a ram of a clamping cylinder provided on the second movable platen is fixed to a rear surface of the first movable platen. In this modification example, a mold opening/closing mechanism similar to that is illustrated in FIG. 1 is provided on the bed, and a ball screw nut is fixed to a movable platen (the first movable platen).

Figure 6:
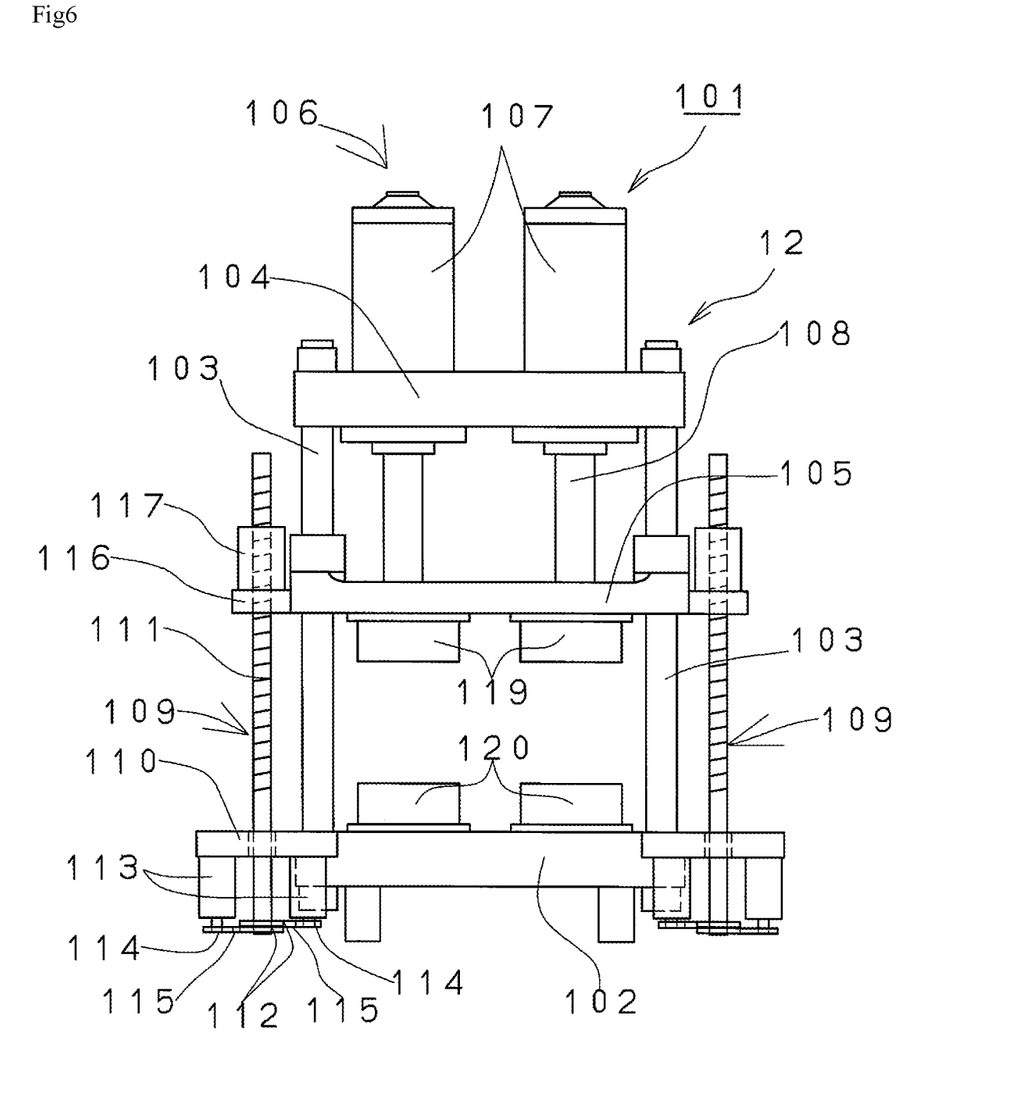
FIG. 6 is a front view of an injection molding machine according to still another embodiment that is a different embodiment from FIG. 5.

Subsequently, there is described still another embodiment illustrated in FIG. 6 that is a different embodiment from FIG. 5. A molding machine illustrated in FIG. 6 is a vertical injection molding machine 101 in which four tie bars 103 are fixed to a lower stationary platen (a stationary platen) 102 in a standing manner, and are also fixed to an upper platen 104. The tie bars 103 are provided with a movable platen 105 so that the movable platen 105 can move in an up-and-down direction. One to four clamping cylinders 107 of a clamping mechanism 106 are fixed to the upper platen 104, and rams 108 of their clamping cylinders 107 are fixed to a rear surface of the movable platen 105. Two to four mold opening/closing mechanisms 109 are provided between the lower stationary platen 102 or a bed and the movable platen 105.

To explain one of the mold opening/closing mechanisms 109, a bearing is attached to a bracket 110 provided on a side surface of the lower stationary platen 102 or the bed, and a proximal end of a ball screw 111 is rotatably inserted into the bearing. The ball screw 111 is a ball screw with single-start threads, and its shaft center is vertically attached. A plurality of (two) driven pulleys 112 and 112 are fixed to the proximal end side (the lower side) of the ball screw 111. At least two servomotors 113 and 113 (electric motors) are fixed to near both ends of the ball screw 111, and drive pulleys 114 and 114 are fixed to respective drive shafts of the servomotors 113 and 113. The drive pulleys 114 and 114 of the servomotors 113 and 113 and the driven pulleys 112 and 112 of the ball screw 111 are connected by timing belts 115 and 115 (first and second belts).

A ball screw nut 117 is fixed to a bracket 116 provided on the movable platen 105. The ball screw 111 is inserted into the ball screw nut 117. Therefore, an upper end of the ball screw 111 is held only by the ball screw nut 117. Note that it does not unthinkable that one end of the ball screw 111 is unlikely to be rotatably held by the upper platen 104 by increasing the length of the ball screw 111. Also in an example illustrated in FIG. 6, after the movable platen 105 is moved down by the mold opening/closing mechanisms 109 to bring a movable mold 119 into contact with a stationary mold 120, half nuts 118 are engaged with tie bars, and the clamping cylinders 107 that are the clamping mechanism 106 are operated to clamp the molds 119 and 120 together. Furthermore, an example where the mold opening/closing mechanism according to the present invention is used in a vertical clamping unit is not limited to the example illustrated in FIG. 6, and it can adopt various types of configurations. As an example, the movable platen 105 may be configured to be moved up and down by four mold opening/closing mechanisms. Furthermore, a rotatable rotary table may be attached to the lower stationary platen 102 or the movable platen 105, and the molds 119 and 120 attached to the rotary table may be configured to move in accordance with rotation of the table. Moreover, although an injection unit is not illustrated in FIG. 6, it can adopt various types of layouts.

Note that in each of the above-described embodiments, the clamping cylinders of the clamping mechanism may be provided on the movable platen. Furthermore, the servomotors of the mold opening/closing mechanisms may be attached to the stationary platen, and the ball screw nut may be attached to the movable platen. Moreover, the servomotors (the electric motors) of the mold opening/closing mechanisms may be attached to the movable platen, and the ball screw nut may be attached to the stationary platen or the bed. Furthermore, transmission of a driving force from the servomotor (the electric motor) of the mold opening/closing mechanism to the ball screw may be achieved by using gears (including a reducer) between the ball screw and the drive shaft of the electric motor, or may be a combination of driving force transmission using gears (including a reducer) and driving force transmission using a belt. Furthermore, the timing belt hung around one driven pulley of the ball screw may be driven by two servomotors (electric motors). The electric motors may be any motor other than a servomotor. Moreover, in the present invention, the above-described embodiments and their modification examples may be partially combined.

Needless to say, the present invention is not limited to the above-described embodiments and may be applicable to modifications made by those skilled in the art on the basis of the meaning of the present invention, although not enumerated herein. The molding machine may be an injection molding machine for die casting including light metal, such as magnesium, besides an injection molding machine for resin molding. Furthermore, the molding machine may be a stamping machine that directly feeds a molding material onto a mold. Moreover, it may be a press-molding machine that performs clamping, a vacuum molding machine, a blow molding machine, a compression molding machine, etc. Particularly, in press-molding machines and the like, vertical type in which a movable platen is moved in a vertical direction is general.

What is claimed is:

1. A molding machine comprising:
    a mold opening/closing mechanism configured to move a movable platen to be attached with a movable mold to a stationary platen to be attached with a stationary mold; and
    a clamping mechanism including four tie bars and being independent of the mold opening/closing mechanism, the clamping mechanism being configured to perform a clamping process,
    wherein the mold opening/closing mechanism includes:
        at least two ball screws separate from the four tie bars;
        at least four electric motors that are configured to drive the ball screws; and
        at least two ball screw nuts into which the respective ball screws are inserted;
    wherein each of the at least two ball screws is configured to be driven by at least two of the four electric motors at the same time,
    wherein the two electric motors drive the ball screw by a driving force transmission.

2. The molding machine according to claim 1, comprising:
    wherein each of said at least two ball screws has single-start threads;
    the molding machine further comprising:
    two driven pulleys fixed to the respective two ball screws having single-start threads;
    drive pulleys each fixed to a drive shaft of a corresponding one of the two electric motors that drive the respective two ball screws having single-start threads;
    a first belt hung around one of the two driven pulleys and one of the drive pulleys;
    a second belt hung around the driven pulley that the first belt is not hung around and the drive pulley that the first belt is not hung around; and
    wherein each of the two ball screws having single-start threads is inserted into the ball screw nut.

3. The molding machine according to claim 1, wherein four tie bars are inserted into the movable platen, and
    the ball screw nut is fixed to a portion of the movable platen below respective upper portions of circumferential surfaces of two of the four tie bars located on a lower side.

4. A method for controlling a molding machine,
    the molding machine including:
        a mold opening/closing mechanism configured to move a movable platen to be attached with a movable mold to a stationary platen to be attached with a stationary mold; and
        a clamping mechanism including four tie bars and being independent of the mold opening/closing mechanism, the clamping mechanism being configured to perform a clamping process,
    wherein the mold opening/closing mechanism includes:
        at least two ball screws separate from the tie bars;
        at least four servomotors that are configured to drive the ball screws; and
        at least two ball screw nuts into which the respective ball screws are inserted,
    wherein each of the at least two ball screws is driven by at least two of the four servomotors at the same time,
    wherein the two servomotors drive the ball screw by a driving force transmission
    the method comprising:
    using an encoder of any one of the servomotors to provide a detection value, and
    using the detection value as a position of the movable platen to perform control.

5. The molding machine according to claim 2, wherein four tie bars are inserted into the movable platen, and
    the ball screw nut is fixed to a portion of the movable platen below respective upper portions of circumferential surfaces of two of the four tie bars located on a lower side.

* * * * *